United States Patent [19]

Valdespino

[11] 4,289,041

[45] Sep. 15, 1981

[54] RECIPROCATOR FOR USE WITH ROTARY DRILLS

[76] Inventor: Joseph M. Valdespino, 5023 Golf Club Pkwy., Orlando, Fla. 38208

[21] Appl. No.: 36,096

[22] Filed: May 4, 1979

[51] Int. Cl.³ ........................ F16H 25/12; F16H 25/16

[52] U.S. Cl. ........................................ 74/56; 173/121; 173/123

[58] Field of Search .................... 74/56; 173/121, 123; 433/121, 122, 123

[56] References Cited

U.S. PATENT DOCUMENTS

| | | | |
|---|---|---|---|
| 933,718 | 9/1909 | Mahoney | 74/56 X |
| 1,588,832 | 6/1926 | Young | 74/56 |
| 1,759,842 | 5/1930 | Fossa | 74/56 X |
| 1,825,072 | 9/1931 | Keller | 74/56 X |
| 2,211,741 | 8/1940 | Elwell | 74/56 |
| 2,270,929 | 1/1942 | Bugg | 74/56 |
| 2,286,521 | 6/1942 | Walter | 173/123 X |
| 2,501,542 | 3/1950 | Sheldon | 173/123 X |
| 2,518,429 | 8/1950 | Moorhead | 173/123 X |
| 2,534,943 | 12/1950 | Bergeson | 74/56 |
| 2,655,921 | 10/1953 | Haboush | 173/123 X |
| 2,657,383 | 11/1953 | Siering et al. | 173/123 X |
| 3,334,694 | 8/1967 | Schnettler | 173/123 X |
| 3,449,967 | 6/1969 | Danesik | 173/123 X |
| 3,807,242 | 4/1974 | Stone | 74/56 |

*Primary Examiner*—Lawrence J. Staab

*Attorney, Agent, or Firm*—Duckworth, Hobby, Allen, Dyer & Pettis

[57] ABSTRACT

A device for driving a tool with a reciprocating motion utilizing a rotary electric or pneumatic hand drill as a power source. The device includes a main shaft adapted to be held in a three-jaw chuck of a hand drill and having a concentric sleeve-like rear eccentric attached thereto. The shaft is arranged to rotate in a bearing in a handle frame. A forward sleeve-like eccentric is disposed on the forward end of the main shaft and adapted to slide forward and backward on the main shaft, and on a guide rod parallel to the main shaft, having a compression spring and attached to the handle frame. The front end of the forward eccentric is internally threaded to accept a tool-holding chuck. In operation, the main shaft is attached to a power hand drill which rotates the shaft. The rear eccentric rotates against the forward eccentric causing it to reciprocate and drive a tool held in a front chuck.

2 Claims, 4 Drawing Figures

10
11
12
13
14
15
15'
16
17
18
19
20
21
22
23
24
25
26
28
30
32
32'
33
35
36
37
38
38'
39
A
B
C
D
E

RECIPROCATOR FOR USE WITH ROTARY DRILLS

BACKGROUND OF THE INVENTION

The invention relates to a reciprocator for use with a power hand drill and in particular a reciprocator for driving tools requiring a reciprocating motion which utilizes any motorized hand drill as a power source.

Many tools are in common use which require a reciprocating motion such as files, chisels, star drills, and hack saws. While special electrical or pneumatic drivers are avialable for driving such tools, a need exists for a low cost tool reciprocator which may be driven by widely available small electric hand drills or by pneumatic rotary drills. Such a unit is a particular value to the homeowner or occasional user for whom the investment in a special driving tool is not warranted. A low cost, easy to use, reciprocating tool driver is therefore needed which can fit the chuck of a small hand drill and that can supply a controllable and adjustable reciprocating motion to a tool.

SUMMARY OF THE INVENTION

The present invention provides a universal tool reciprocator to be driven by a power tool which can be manufactured and sold at low cost, will handle a variety of tools, and is adapted to be driven from any small rotary hand drill.

A main shaft is provided having on end thereof adapted to fit a universal three-jaw chuck of an electric drill or the like. The main shaft is passed through a central cylindrical passage in a pair of concentric eccentric sleeve-like members, securely attached to the rear eccentric member, and slidably engaged with the front eccentric member. The front and rear eccentric members are formed from sleeve-like cylindrical metal stock having matching lateral diagonal cuts therethrough. The rear eccentric member is carried in a bearing in a handle portion and freely rotatable within such bearing. The main shaft is inserted into the concentric opening through the rear eccentric member and may be rigidly attached thereto by pinning or by threads and a lock nut. Thus, as the main shaft is rotated by a drill, the rear eccentric member rotates. The front eccentric member includes a downward projecting slide block arranged to slide on a guide bar disposed parallel to the main shaft and rear eccentric member. The rearward end of the guide bar is attached to the handle just below the rear eccentric member bearing. The main shaft extends through the rear eccentric member and into an opening through the front eccentric member concentric with its outside diameter. As may now be recognized, the front eccentric member can slide longitudinally on the main shaft and on the guide bar. The front end of the guide bar is threaded to accept the stroke adjusting nut which it utilized to adjust the tension in a coil compression spring disposed between the nut and the front eccentric guide block. The forward motion of the front eccentric member is therefore against the tension of the return spring. The diagonal cut laterally through the rear eccentric member is at the front thereof and the matching diagonal cut of the front eccentric is at its rear portion. Then, in a first or mated position, the two diagonal surfaces are in full contact with the return spring forcing the front eccentric and the rear eccentric members into such contact.

As the main shaft is rotated, the rear eccentric member rotates with respect to the front eccentric member which is constrained from rotating by the slide block and guide bar; therefore, the most forward portion of the rear eccentric member rotates so as to urge the front member forward to separate the two diagonal surfaces of the front and rear eccentric members with the result that a 180° rotation of the rear eccentric member will cause the front eccentric member to move forward its maximum amount. As the front eccentric moves forward, it slides on the projecting main shaft and the slide block moves forward on the guide bar compressing the return spring. As the main shaft continues to rotate and completes a 360° rotation, the most forward portion of the rear eccentric member is back in its first or mating position and the return spring has forced the front eccentric back such that the diagonal faces are again in full contact. As may now be seen, continuous rotation of the main shaft by the drill causes the rotation of the rear eccentric member to force the front eccentric to move backward and forward in the desired reciprocating motion. The front end of the front eccentric is provided with an internal thread in its concentric opening into which a suitable chuck may be mounted for holding the desired tool.

To use the universal hand drill reciprocator, the operator attaches the desired chuck and tool to the front eccentric, and clamps the rear main shaft end in the chuck of a suitable electric hand drill. The handle of the reciprocator is held in one hand and the handle of the electric drill is held in the other hand. When the electric drill is operated, the tool is given the desired reciprocating motion and can be applied to the work at hand.

Control over the length of the stroke of the tool may be exercised to some degree by adjusting the return spring. When the tension is light on the return spring, the inertia of the front eccentric and the tool are such that the front eccentric will not fully return to the first position during operation but will tend to float somewhat as the tool is operated. Tightening of the spring to increase the tension thereof will overcome the inertia effect causing a forward turn of the front eccentric and thereby producing a maximum stroke.

The hand drill reciprocator is especially useful with variable speed type drills in which case the optimum reciprocation rate can be selected.

It is therefore a principle object of the invention to provide a tool reciprocator to be driven from a wide variety of rotary hand drills.

It is another object of the invention to provide a universal hand drill reciprocator that can be built at low cost and is compact and easy to operate.

It is another object of the invention to provide a universal hand drill tool reciprocator that may be easily adjusted for the length of its stroke.

It is yet another object of the invention to provide a universal tool reciprocator which can accept various chucks for different tools.

These and other objects and advantages of the invention will be apparent upon the reading of the following detailed description in conjunction with the drawing.

DESCRIPTION OF THE PREFERRED EMBODIMENT

Figures 1, 2, 3, 4:
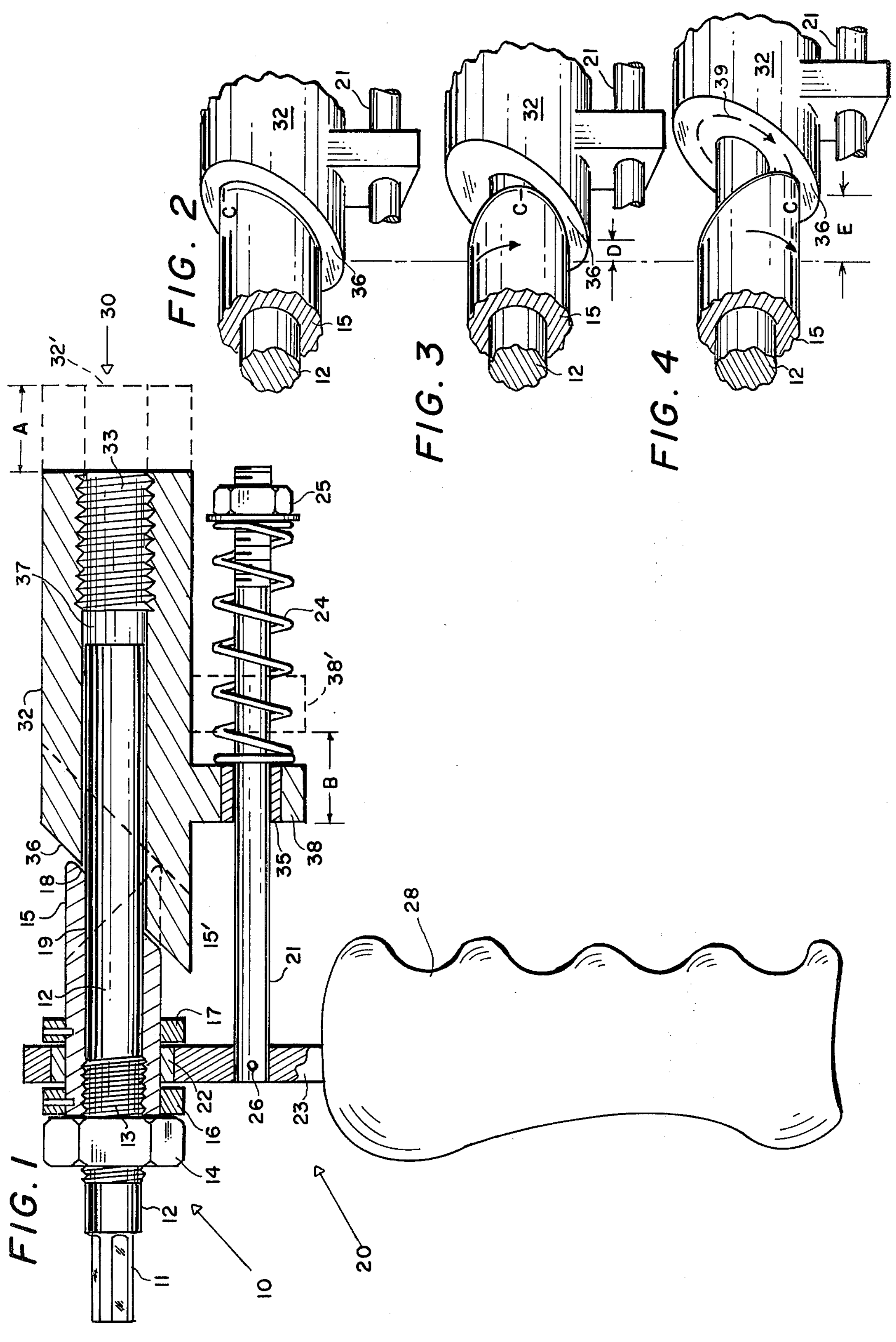
FIG. 1 shows a partial cross-sectional view of the invention illustrating the operational features thereof.
FIG. 2 is a partial perspective view of the front and rear eccentric portions of the implementation of FIG. 1.
FIG. 3 is the view of FIG. 2 with the rear eccentric element rotated 90°.
FIG. 4 is the view of FIG. 2 with the rear eccentric element rotated 180°.

Referring to the FIG. 1, the constructional details of a preferred embodiment of the universal reciprocating tool for use with hand drills is shown in partial cross section. The main elements of the invention are: a handle portion 20 forming a framework for holding of the moving parts of the device; a rotatable section 10 to be driven by an electric hand drill or the like including a main shaft 12 and a rear eccentric 15; and a reciprocating section 30 including front eccentric 36 arranged to carry the desired tool.

In the rotatable section 10, a main shaft 12 is seen having a threaded portion 13 toward the rear and a reduced diameter portion 11 having flats adapted to fit a three-jaw chuck. Main shaft 12 is thus adapted to be driven from an electric drill or the like. Rear eccentric 15 is formed from a cylindrical sleeve-like section of steel rod having a concentric cylindrical central opening 19 therethrough for the passage of main shaft 12. The opening 19 has internal threads at its rear end into which the threaded portion 13 of main shaft 12 is threaded and locked by lock nut 14. Rear eccentric member 15 rotates in bearing 22 in handle frame 23 with collars 16 and 17 pinned to rear eccentric member 15 on either side of handle frame 23 to captivate rotatable section 10 therein. Rear eccentric member 15, as may be noted from FIG. 1, has its forward end diagonally cut with respect to its longitudinal axis forming a diagonal face 18 thereon. This angle may be, for example, 45° or may be varied in the initial design to obtain a desired maximum displacement of the reciprocating element 30 of the invention. As may be noted, the outer periphery of face 18 is rounded to reduce stresses at the edges as will be described in more detail below, with face 18 case hardened to minimize wear.

Front eccentric member 32 of reciprocating section 30 consists of a sleeve-like cylindrical section of steel rod having its rear portion cut at an acute angle with respect to its longitudinal axis to match the angle of rear eccentric member 15. This angle cut forms diagonal face 36 which matches face 18 of rear eccentric member 15. Preferably, the outside diameter of front eccentric member 13 is somewhat larger than the outside diameter of rear eccentric member 15 as illustrated in FIG. 1 and face 36 is case hardened. Front eccentric member 32 is drilled longitudinally forming concentric sleeve-like opening 37 for receiving the forward end of main shaft 12. The forward end of opening 37 is formed with internal threads 33 for accepting various chucks for holding the tool to be driven by the reciprocator.

Front eccentric element 32 has a slide block 38 projecting downward and engaged with guide rod 21. Guide rod 21 is affixed to handle frame 23 by pin 26 and parallel with main shaft 12. A bushing 35 is disposed in slide block 38 to allow reciprocating element 30 to slide on guide rod 21. As may now be seen, shaft 12 is free to rotate in opening 37 and forward eccentric member 32 is prevented from rotating by slide block 38 and guide rod 21. The forward end of guide rod 21 is threaded to accept spring adjusting nut 25 with a compression coil spring 24 disposed between slide block 38 and adjusting nut 25. Handle portion 20 includes a hand hold 26 by which the operator grips the tool when in use.

Having now described the essential construction features of the preferred embodiment of the invention, the operation thereof will now be explained with reference to FIGS. 1, 2, 3, and 4. In FIG. 1, rear eccentric member 15 and front eccentric member 32 are illustrated in their retracted position as also shown in the partial perspective view of the eccentric assembly in FIG. 2. ASsume that shaft 12 is being rotated clockwise as viewed from the rear by a drill attached to reduced section 11 of main shaft 12. As point C in FIG. 2 of rear eccentric member 15 rotates about 90° as indicated in FIG. 3, the forward edge C of diagonal surface 18 has moved to the position shown. Forward eccentric member 32, being maintained stationary by guide rod 21, will be forced forward as shown at D in FIG. 3 with the rounded edge of point C of the periphery of surface 18 sliding on diagonal face 36. As rear eccentric member 15 continues to rotate to the approximate 180° point as shown in FIG. 4, forward eccentric member 32 is urged forward to its maximum excursion E by rear eccentric member 15. As best seen in FIG. 1, the 180° positions are indicated by dashed lines with rear eccentric member 15' and front eccentric member 32' with the maximum forward excursion of front eccentric member 32 shown by arrow A. As slide block 38 moves forward as shown by arrow B, compression spring 24 is compressed such that with continued rotation of rear eccentric member 15 back to the 0° position of FIG. 1, spring 24 will tend to cause front eccentric member 32 to follow.

By selection of the strength of spring 24, the maximum stroke of the reciprocating action of the reciprocating portion 30 may be conveniently controlled by adjusting nut 25. When adjusting nut 25 is turned outward to reduce the tension of spring 24, the inertia of the mass of reciprocating section 30 and the attached tool will prevent the full return of front eccentric member 32 as rear eccentric member 15 returns to its 0° position. Thus, the front eccentric member 32 effectively floats for such adjustment. Tightening of spring 24 by adjusting nut 25 will apply sufficient tension to spring 24 that the inertia may be overcome and front eccentric member 32 may follow rear eccentric member 15 closely, thus achieving the maximum degree of reciprocation indicated by arrow A. Where the operator is utilizing a variable speed electric hand drill to operate the reciprocator of the invention, the stroke of the tool may be controlled to some degree by the drill speed which, of course, varies the kinetic energy stored in the reciprocating section 30 and the tool being operated.

As may be noted from FIGS. 2, 3 and 4, the main area of contact between rear eccentric member 15 and face 36 of front eccentric member 32 is the most forward region around point C. The periphery of face 18 at this point is therefore rounded so as to form a smooth and relatively broad contact area to minimize wear at this point. Any of the well-known methods in the art may be utilized to provide a hard, wear resistant surface at this point as well as around the circumference 39 of face 26 where contacted by area C of rear eccentric member 15 as seen in FIG. 4.

A tool reciprocator has now been disclosed that is adapted to be operated by a wide variety of portable electric or pneumatic hand drills for driving tools requiring a reciprocating motion such as chisels, saws, star drills, riveters, and the like. The invention is seen to be of relatively simple construction and low cost. Although the invention may be conveniently operated from an external rotary power source, a self-contained reciprocator tool may be obviously implemented by the addition of a suitable drive motor to the disclosed structure. A specific construction of the preferred embodiment has been disclosed for exemplary purposes; however, it is obvious that many changes and modifications can be made without departing from the spirit and scope of the invention.

I claim:

1. A device for driving a tool with a reciprocating motion and adapted to be operated from a rotary power source comprising:
- a stationary frame having a shaft bearing therein;
- a hand grip attached to said frame for holding of said device by a user;
- a cylindrical sleeve-like eccentric member having an angular forward surface, said forward surface cut at a selected acute angle with respect to the longitudinal axis of said eccentric member with the periphery, formed by the junction of said cylindrical eccentric member and the face formed by said forward surface cut, being rounded to form a broad contact area, said eccentric member disposed on and concentric with said shaft and rigidly attached thereto, said shaft and said eccentric disposed in said shaft bearing and rotatable with respect thereto, said front end of said shaft projecting from said angular forward surface;
- a cylindrical sleeve-like tool driving member having an angular rear surface thereof cut at said selected acute angle, and a forward end having internal threads therein for accepting a tool holding chuck, said driving member slidably disposed on and concentric with said front end of said shaft, said driving member having a diameter greater than the diameter of said eccentric member;
- a downward projecting slide block attached to said cylindrical driving member, said slide block having a rod bearing therethrough;
- a guide rod attached to said frame and slidably engaged with said rod bearing of said slide block; and
- an external, adjustable compression spring, connected to said guide rod and said slide block, and adapted to urge said angular rear surface of said driving member into contact with said broad contact area of said eccentric member, said spring adjustable to vary the length of the reciprocating stroke of said tool;

whereby rotation of said shaft causes said broad contact area of said eccentric member to rotate against said angular rear surface of said driving member so as to slide said driving member alternately forward on said shaft against the compression of said spring and rearward on said shaft in response to the tension in said spring, thereby resulting in a longitudinally reciprocating motion of said driving member.

2. A device for driving a tool with a reciprocating motion comprising:
- a stationary frame means having handle means for holding of the device by the operator;
- a cylindrical shaft having a front end and a rear end, said rear end adapted to be held by a rotating chuck;
- a cylindrical sleeve-like eccentric member having an angular forward surface, said forward surface cut at a selected acute angle with respect to the longitudinal axis of said eccentric member and having a smoothly rounded edge to form a broad contact area, said eccentric member disposed on the concentric sleeve of said shaft and rigidly attached thereto, said front end of said shaft projecting from said angular forward surface;
- a tool driver supported by said frame means and said shaft having a cylindrical sleeve-like tool driving member with a diameter greater than the diameter of said eccentric member, said driving member having an angular rear surface thereof cut at said selected acute angle and a forward end having internal threads therein for accepting a tool-holding chuck, said driving member slidably disposed on and concentric with said projecting end of said shaft, said driving member constrained to move only in a reciprocating motion parallel to said cylindrical shaft; and adjustment means operatively connected to said tool driver and having a downward projecting slide block attached to said cylindrical driving member, said slide block having a rod bearing therethrough, a guide rod attached to said frame and slidably engaged with said rod bearing of said slide block, a compression spring connected to said guide rod and said guide block and adapted to urge said rear surface of said driving member into contact with said broad contact area of said eccentric member, and tension adjustment means operative against said compression spring for varying the lengths of the reciprocating stroke of said driving member.

* * * * *